United States Patent [19]
Kazlauskas

[11] 3,835,286
[45] Sept. 10, 1974

[54] WELDING ELECTRODE STRUCTURE AND FILLER WIRE MECHANISM FOR AN AUTOMATIC WELDING APPARATUS

[75] Inventor: Gasparas Kazlauskas, North Hollywood, Calif.

[73] Assignee: Astro-Arc Co., Sun Valley, Calif.

[22] Filed: June 11, 1973

[21] Appl. No.: 368,767

[52] U.S. Cl. .............................. 219/130, 219/125
[51] Int. Cl. .................................. B23k 9/12
[58] Field of Search ............ 219/130, 124, 125, 60, 219/75

[56] References Cited
UNITED STATES PATENTS

| | | | |
|---|---|---|---|
| 2,360,160 | 10/1944 | Pickhaver | 219/130 |
| 2,469,790 | 5/1949 | Schmerber | 219/130 |
| 2,681,401 | 6/1954 | Anderson | 219/130 |
| 2,983,807 | 5/1961 | Schultz et al. | 219/125 R |
| 3,102,947 | 9/1963 | Blackman | 219/130 |

Primary Examiner—J. V. Truhe
Assistant Examiner—Clifford C. Shaw
Attorney, Agent, or Firm—Robert E. Geauque

[57] ABSTRACT

In an automatic welding apparatus wherein the welding electrode is to move longitudinally in a prescribed path to produce a weld bead upon a workpiece, the welding electrode and welding electrode housing being pivotally mounted in respect to the welding apparatus housing, a shaft interconnecting the welding electrode housing and the welding apparatus housing, the shaft being movable in predetermined increments to effect precise angular movement of the welding electrode housing with respect to the welding apparatus housing, a filler wire mechanism being universally mounted in respect to the welding apparatus housing, a portion of the filler wire mechanism being pivotal along with the welding electrode housing.

5 Claims, 8 Drawing Figures

3,835,286

PATENTED SEP 10 1974

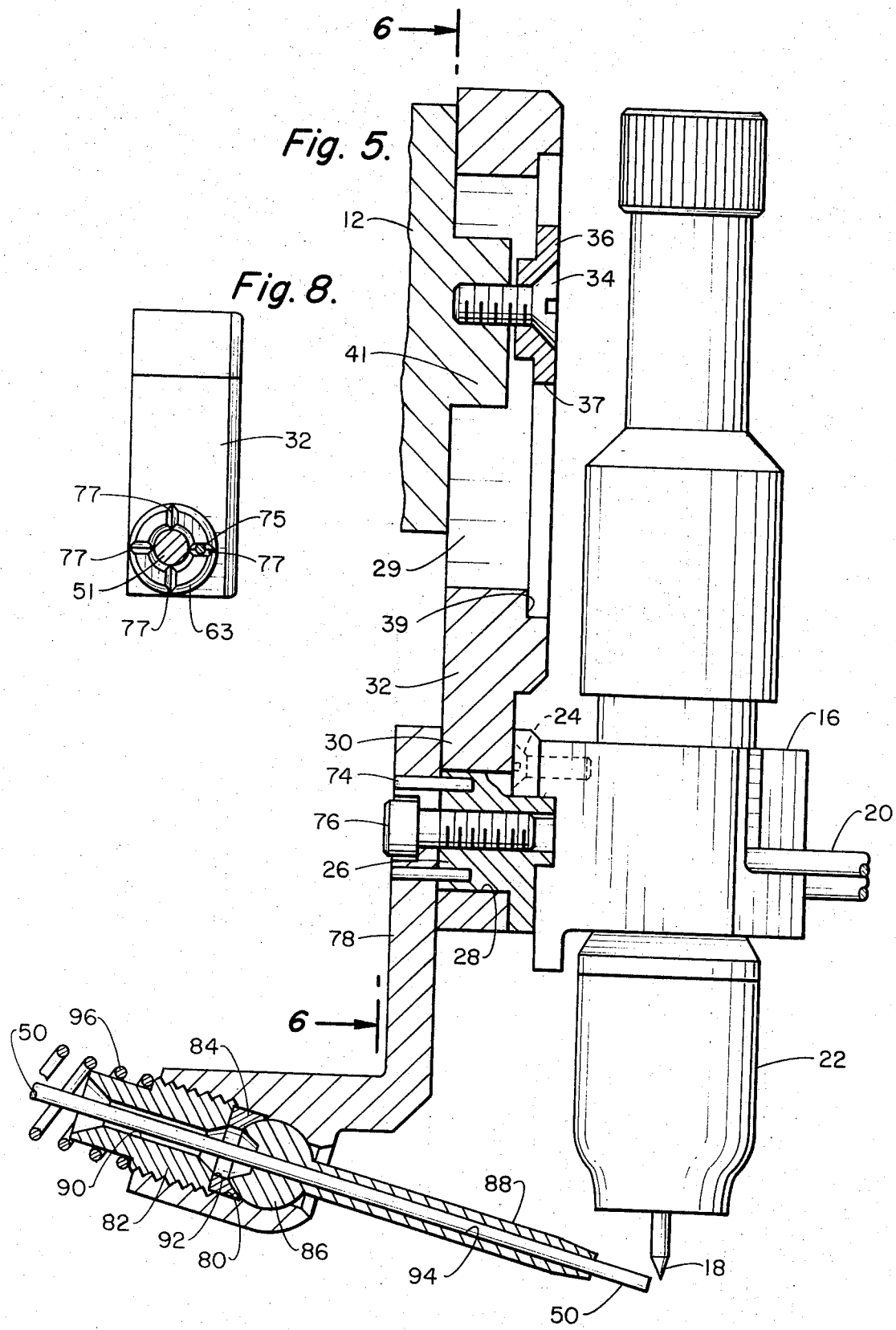

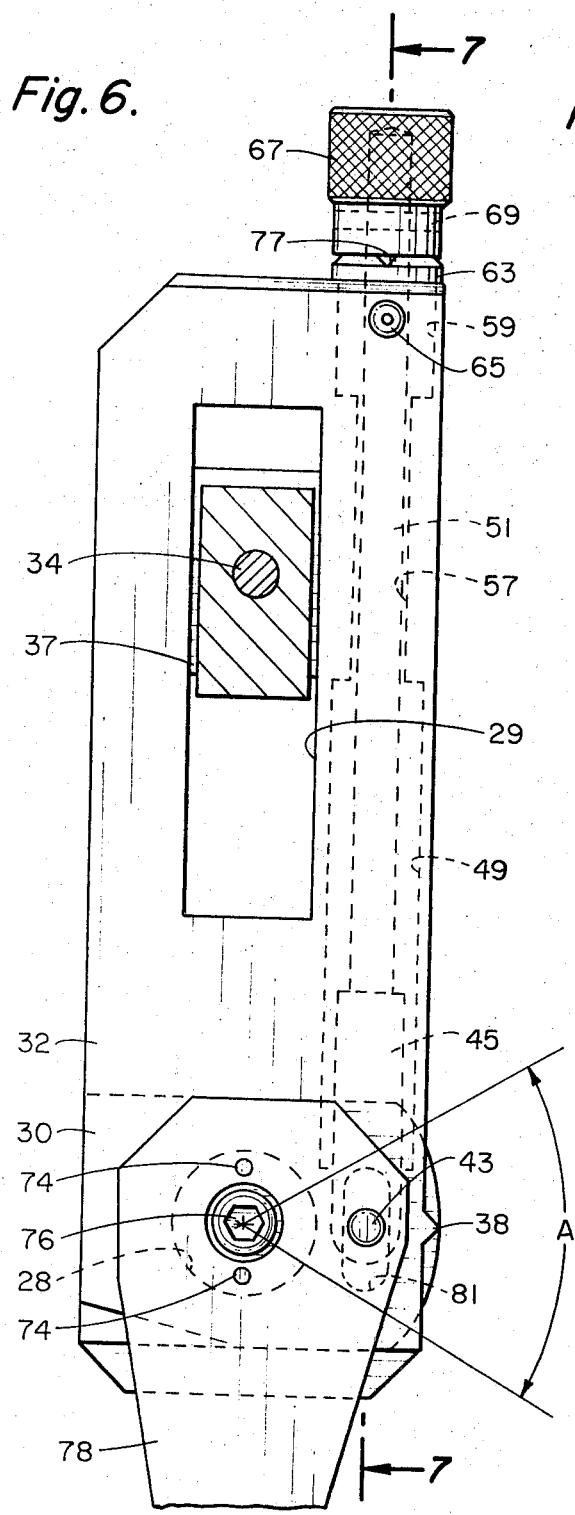
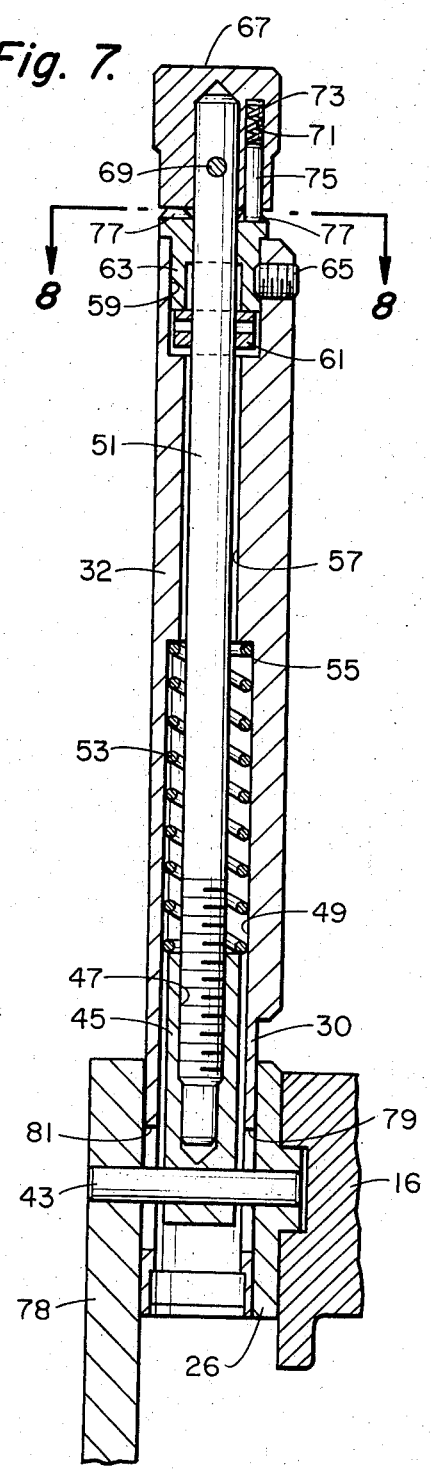

WELDING ELECTRODE STRUCTURE AND FILLER WIRE MECHANISM FOR AN AUTOMATIC WELDING APPARATUS

BACKGROUND OF THE INVENTION

The field of this invention relates to the welding of separate metallic cylindrical tubular elements by the gas shielded tungsten electro-arc welding process. More particularly, this invention relates to structures to be employed in combination with an apparatus which uses automatic gas tungsten arc-welding along a circumferential path in tubular structures.

Within recent years there have been commercially available structures to automatically weld together separate sections of pipe. These structures are required to compensate for the problem of the welding of the larger diameter workpieces. These structures effect the welding operation automatically, it only being necessary to locate the pipe sections within the welding apparatus and initiating the welding procedure. Such an apparatus is shown and disclosed within U.S. Pat. application Ser. No. 227,886, filed Feb. 22, 1972, assigned to the assignee of the present invention. Actually, the present invention is an improvement of the structure shown and described within the aforesaid application.

However, the structures of the prior art have included certain inherent deficiencies and is particularly deficient where the welding of substantially thick tubular structures is to be effected. A thick tubular structure is one which is normally an inch or larger in thickness. The weld bead in such instances will be also a half an inch or more in width. The prior art welding apparatuses cause the welding electrode to move in a straight line which results in a weld bead being produced having a quite high center and not filled in at the sides of the weld. Therefore, in order to avoid this, it is desirable to have the welding electrode oscillate transversely across the weld bead as the welding electrode moves longitudinally. However, even with transverse oscillation, the produced weld bead still tends to be high in the center and not filled in at the edges. Therefore, the welding apparatus of the aforesaid application was designed to overcome these deficiencies by incorporating a transverse oscillatory welding electrode wherein the electrode dwells at the limits of its oscillatory movement in order to fill in the edges of the weld bead.

However, within a substantially thick material, the gas cup of the welding electrode extends within the welding cavity. During the oscillatory movement of the welding electrode, the gas cup will contact the side walls of the welding cavity. This prevents the welding electrode from moving directly adjacent the side walls. This deficiency further causes the weld bead to be quite high in the center and not filled in at the sides of the weld. Also, the weld produced at the side walls is normally an inferior quality weld.

SUMMARY OF THE INVENTION

The welding apparatus of this invention permits the welding electrode to be positioned directly adjacent the side walls of the welding cavity, although the gas cup of the welding electrode protrudes within the welding cavity.

The welding electrode within the welding apparatus of this invention is mounted within a welding electrode housing. The welding electrode housing is pivotally mounted by means of a journal to the welding apparatus housing. An adjusting shaft is interconnected between the welding electrode housing and the welding apparatus housing. A knob is connected to the shaft and is mounted upon the welding apparatus housing. The other end of the shaft is threadably connected to a portion of the welding electrode housing structure. Turning of the knob causes relative movement between the shaft and the welding electrode housing structure. The shaft is mounted off-center with respect to the center point of pivotal movement of the journal. Rotation of the shaft (caused by manual turning of the knob) results in relative movement between the shaft and the welding electrode housing structure which causes the welding electrode housing to pivot about the journal. A filler rod positioning assembly is fixedly positioned to the journal so that the filler wire will move along with the welding electrode during the pivoting action thereof. The filler wire feeding mechanism includes a first guide rod which is universally mounted in respect thereto. The first guide rod is supported by means of a spring with respect to the filler wire positioning assembly. A second guide rod protrudes from the positioning assembly and is capable of movement in respect thereto and can be fixed in position so as to position the filler wire directly adjacent the welding electrode.

BRIEF DESCRIPTION OF THE DRAWINGS

FIG. 5 is an enlarged cross-sectional view taken along line 5—5 of FIG. 2;

FIG. 6 is a back view of the apparatus of this invention taken along line 6—6 of FIG. 5;

FIG. 7 is a cross-sectional view through the apparatus of this invention taken along line 7—7 of FIG. 6; and FIG. 8 is a partly-in-section view taken alone the line 8—8 of FIG. 7.

DETAILED DESCRIPTION OF THE SHOWN EMBODIMENT

Figure 1:
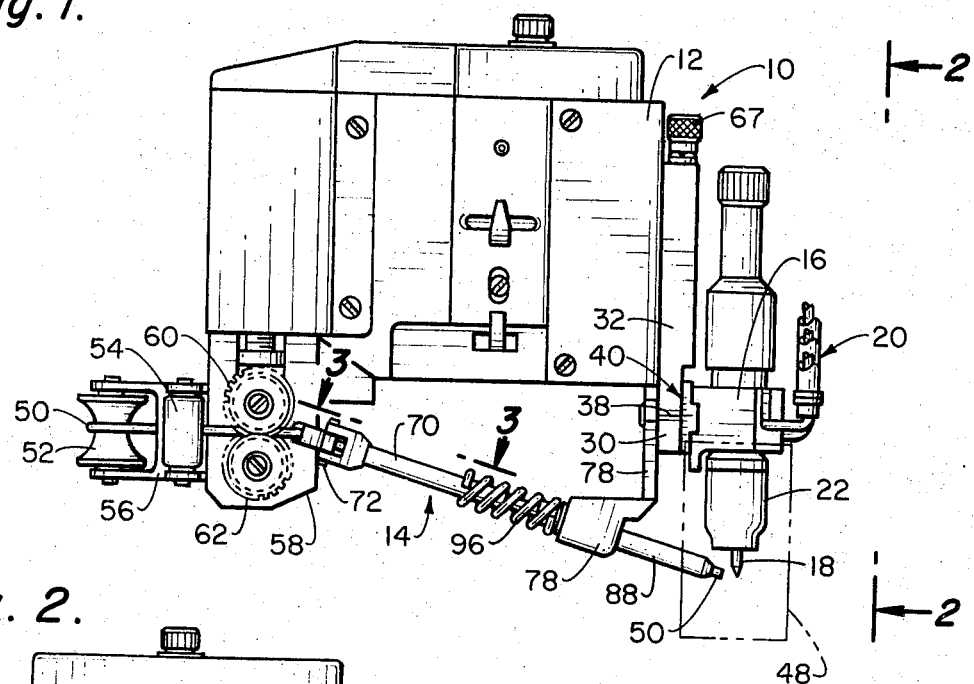
FIG. 1 is a front view of the overall apparatus of this invention.

Referring particularly to the drawings, there is shown the welding head apparatus 10 of this invention which includes basically an apparatus housing 12, a filler wire feeding mechanism 14 and a welding electrode housing 16. The welding head apparatus 10 is to provide for welding of a first cylindrical tube 46 to a second cylindrical tube 48 by the gas tungsten arc welding process. The welding head apparatus 10 is to produce a welding bead to result in the integral connection between the tubes. It is envisioned that the cylindrical tubes are to be of enlarged diameters in what is commonly termed pipes. Although the apparatus of this invention has been found to be particularly applicable to the welding of thicker structures, it is to be considered within the scope of this invention to employ the apparatus of this invention in other welding environments such as welding structures of lesser thicknesses.

Within the electrode housing 16 is supported a welding electrode 18. Flexible conduits 20 are to supply within the electrode housing 16 the electrical energy to the electrode 18. Inert gas is to be conducted within the electrode housing 16 and is to be contained about the welding area by means of a gas cup 22. The internal components of the electrode housing 16 are not directly a part of this invention and therefore need not be described here in detail. The elements thereof are considered to be conventional and well known in the field. Additionally, the electrical energy to the electrode 18 as well as the insert gas is deemed to be supplied from conventional sources and also need not be described. It is to be noted that the electrode 18 is basically what is termed a non-consumable electrode and will normally be formed of tungsten material.

The electrode housing 16 is fixedly secured by screws 24 to a journal 26. The journal 26 is cylindrical in configuration and is rotatably mounted within an opening 28 formed within a sleeve 30. The sleeve 30 is an extension of a mounting plate 32 which is fixedly secured by screw 34 to the apparatus housing 12. Screw 34 cooperates with an attaching plate 36 with the attaching plate 36 including a periperal flange 37. The transverse edges of the flange 37 are to be in abutment with a shoulder 39 formed within the mounting plate 32. The fastener 34 threadably connects with upstanding boss 41 which is integrally formed as a part of the apparatus housing 12. The upstanding boss 41 extends within an elongated opening 29 formed within the mounting plate 32. The mounting plate 32 is fixedly secured to the apparatus housing 12 by means of tightening of the fastener 34 which binds the flange 37 of the plate 36 into tight frictional engagement with the shoulder 39. By loosening the fastener 34, the mounting plate 32 can be moved relative to the boss 41 thereby permitting adjustment of the mounting plate 32 and the electrode housing 16 in respect thereto.

A pin 43 is mounted within appropriate aligned apertures located in positioning assembly housing 78 and electrode housing 16. A connector 45 is pivotally mounted on the pin 43 and located in between the housing 78 and the housing 16. The connector 45 includes a threaded aperture 47. The connector 45 extends within an elongated chamber 49 located within the mounting plate 32. A threaded shaft 51 passes through the chamber 49 and is threadably connected in the threaded opening 47. A spring 53 is located in chamber 49 and is to be in abutting engagement with the connector 45 and the inner end 55 of the chamber 49. The shaft 51 also passes through opening 57 which connects with the chamber 49. Opening 57 also communicates with an enlarged recess 59 formed within the mounting plate 32. A roll pin 61 extends through the shaft 51 and is located in the recess 59. A bushing 63 cooperates within the recess 59 and has an opening therein through which the shaft 51 passes. The shaft 51 is capable of rotational movement relative to the bushing 63. The roll pin 61 functions as a stop limiting the upward withdrawing movement of the shaft 51 by the pin 61 coming into abutting contact with the bushing 63. A set screw 65 extends through the mounting plate 32 and is to be in frictional engagement with the bushing 63.

The outer end of the shaft 51 is fixedly connected to a knob 67 by means of a pin 69. A recess 71 is formed within the knob 67 and includes a spring 73 and a detent pin 75. The spring 73 exerts a continuous bias against the pin 75 tending to force such toward and into engagement with the bushing 63. The bushing 63, located about the shaft 51, includes four equiangularly spaced apart radial grooves 77. The detent 75 is capable of cooperating with any one of the grooves 77. As the knob 67 is manually turned, the shaft 51 is moved relative to the connector 45. However, because of the roll pin 61 being in engagement with the bushing 63 and the knob 67 also being in engagement with the bushing 63, movement of the shaft 51 relative to the mounting plate 32 is prevented. Therefore, the connector 45 is so moved.

However, the connector 45 is connected through pin 43 to both the positioning assembly housing 78 and the electrode housing 16. The pin 43 is limited in its movement defined by the length of the slots 79 and 81 formed within the sleeve 30 of the mounting plate 32. The wire guide positioning assembly housing 78 and electrode housing 16 are pivotally mounted by means of journal 26 to within the mounting plate 32. As a result, by rotation of the shaft 51, the positioning assembly housing 78 and the electrode housing 16 are moved angularly, an angle represented by angle A within FIG. 6 of the drawings. The size of the threading between the shaft 51 and the connector 45 are such that the rotation of the knob 67 90° represents approximately 1° tilt movement of the electrode housing 16 and the positioning assembly housing 78. Therefore, each time the detent pin 75 is moved from one groove 77 to another groove 77, the electrode housing 16 is tilted 1°.

Formed upon the exterior surface of the sleeve 30 is a pointed area 38. Formed upon the exterior surface of the journal 26 are a series of marks 40 with the marks being spaced apart in five degree increments. The total amount of pivotal movement can be accurately determined by positioning the indicia 40 with respect to the pointed area 38. Each mark of the indicia 40 represents 5° and by positioning such directly adjacent the pointed area 38, pivotal movement of the electrode housing 16 of 5° occurs from one mark to the next.

Figure 2:
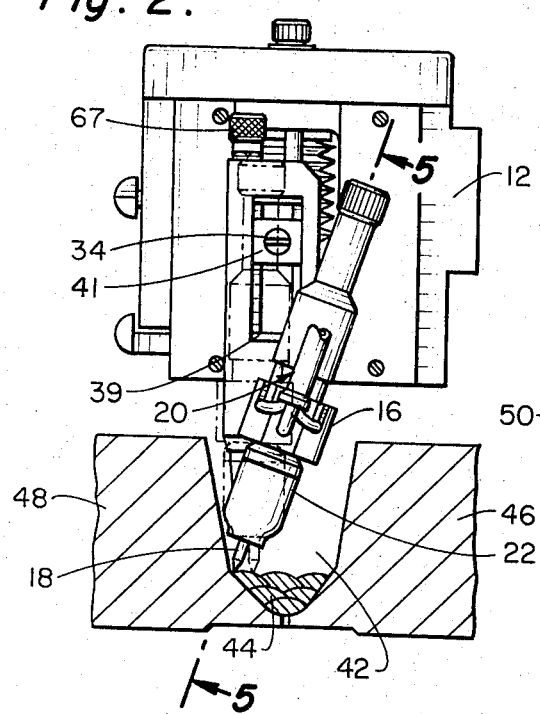
FIG. 2 is a right side view of the apparatus of this invention taken along line 2—2 of FIG. 1.
Figure 3:
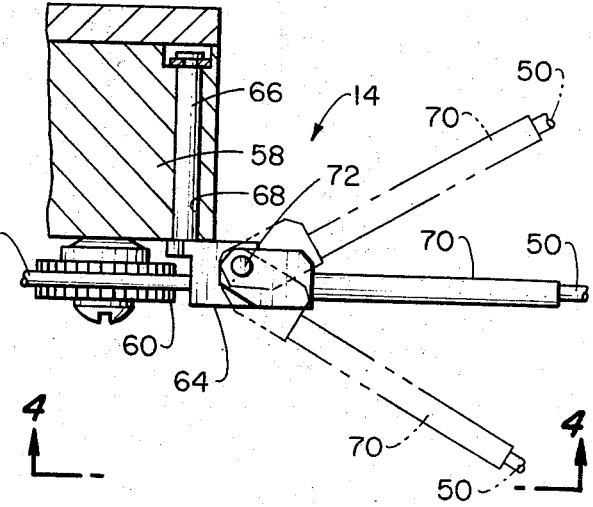
FIG. 3 is a partly cross-sectional view showing in more detail the filler wire feeding mechanism included within this invention.
Figure 4:
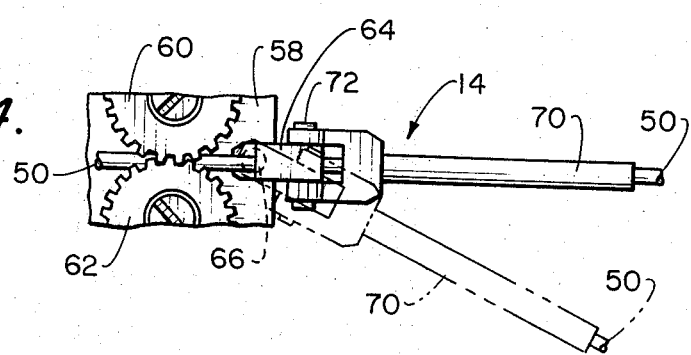
FIG. 4 is a view of the filler wire feeding mechanism of this invention taken along line 4—4 of FIG. 3.

Pivoting movement would be desirable in situations such as presented in FIG. 2 of the drawings. As represented in phantom lines in FIG. 2, it can be seen that the gas cup 22 will interfere with one of the side walls of the welding cavity 42. When such does interfere, it can be seen that the welding electrode 18 will be spaced a small distance from the side wall of the cavity. In these instances a good weld bead adjacent the side wall of the cavity does not occur. In such a situation the welding electrode housing 16 is to be pivoted so that the welding electrode 18 will be located adjacent the side wall of the cavity 42. It is to be understood that the apparatus housing 12 is capable of vertical and tranverse movement so as to facilitate extremely accurate positioning of the electrode 18 adjacent the side wall of the cavity 42.

In a given welding cavity 42, a multitude of weld beads 44 are to be produced one on top of the other until the entire wall cavity is completely filled. In this way an extremely strong integral connection can be produced between the first cylindrical tube 46 and the second cylindrical tube 48.

A filler wire 50 is to be supplied to the welding area by means of the feeding mechanism 14. The feeding of the filler wire 50 is to be automatically accomplished by means of a control mechanism, not shown. The wire 50 is conducted from a spool, not shown, about idler pulley 52 and in between a first roller 54 and a second roller, not shown. The first and second rollers as well as the pulley 52 are rotatably mounted upon a support plate 56. The support plate 56 is fixedly secured to a motor housing 58. The motor housing 58 includes a motor, not shown, which is used to operate a drive gear 60. The drive pulley 60 cooperates with an idler gear 62. The filler wire 50 is to be frictionally bound between the drive gear 60 and the idler gear 62 which, upon rotation of the drive gear 60, effects longitudinal movement of the filler wire 50. The motor within the motor housing 58 is to be automatically controlled so that the end of the filler wire 50 is always maintained directly adjacent the welding area. This is accomplished automatically through a control mechanism (not shown).

A guide block 64 is pivotally mounted about the X-axis by means of a pin 66 positioned within aperture 68 located within the motor housing 58. The guide block 64 includes an aperture therethrough, not shown, which permits passage of the filler wire 50 therethrough.

The first guide rod 70 is bifurcated at its inner end and is pivotally connected by a pin 72 to the guide block 64. The filler wire 50 passes through an opening, not shown, within the first guide rod 70. The first guide rod 70 is then permitted movement along a Y-axis about the guide block 64. As a result, the movement about the Y-axis of the first guide rod 70 and the movement about the X-axis with respect to the motor housing 58 creates a universal movement for the first guide rod 70 in respect to the motor housing 58.

Fixedly connected by locating pins 74 extending within journal 26 and a bolt 76 is the positioning assembly housing 78. It is to be noted that the positioning assembly housing 78 will move in synchronism with the pivotal movement of the electrode housing 16.

The free end of the assembly housing 78 includes an opening 80 formed therethrough. Within one end of opening 80 is a nut 82 which is threadingly supported therein. Nut 82 has a polygonal shape at its end which extends exteriorly of the opening 80. The inner end of the nut 82 is to come into contact with a spherical washer 84 which is to be slightly movable toward a spherical end 86 of a second guide rod 88. The nut 82 includes an interior longitudinal opening 90 with the washer 84 also having a longitudinal opening 92 and a second guide rod 88 having a longitudinal opening 94. The filler wire 50 is adapted to be passed through the openings 90, 92 and 94.

It is desired that a semi-rigid connection be established between the positioning assembly housing 78 and the first guide rod 70. In order to establish the semi-rigid connection, a coil spring 96 is to be located about the free end of the first guide rod 70 and then to be located about the polygonal shaped end of the nut 82. As the electrode housing 16 is pivoting (as does also the positioning assembly housing 78), small movements are capable of occurring between the assembly housing 78 and the first guide rod 70. However, these small movements are not so great as to take the filler wire 50 out of alignment from passing through the first guide rod 70 and through the second guide rod into the opening 90 of the nut. Although a spring 96 is found to be preferable, it is considered to be within the scope of this invention to employ other types of means to effect the desired alignment.

The nut 82 may be loosened which will permit the second guide rod 88 to be moved about its spherical end 86 with respect to the wire guide positioning assembly housing 78. This is to permit a final exacting adjustment of the locating of the filler rod 50 at a particular angle from the welding electrode 18. Once this desired angle has been achieved, the nut 82 is tightened which thereupon fixes the desired position.

What is claimed is:

1. In an automatic welding apparatus having a welding electrode, said welding electrode to move longitudinally in a prescribed path to produce a weld bead upon a workpiece, said apparatus comprising:
   a welding electrode housing containing said welding electrode;
   a welding apparatus housing;
   said welding electrode housing being attached by a first means to said welding apparatus housing, said first means permitting adjustable pivotal movement of said welding electrode housing in respect to said welding apparatus housing, second means located between said welding electrode housing and said welding apparatus housing for fixedly positioning said welding electrode housing in respect to said welding apparatus housing;
   a filler wire feeding mechanism comprising a mechanism housing attached to said welding apparatus housing, said filler wire feeding mechanism adapted to feed a filler wire directly adjacent said welding electrode, a first guide rod connected through a universal joint to said mechanism housing,
   a filler wire positioning assembly fixedly connected to said welding electrode housing, said positioning assembly located directly adjacent said welding electrode, and
   said positioning assembly includes a positioning guide rod mounted by adjustment means to said positioning assembly, said adjustment means permitting movement of said positioning guide rod to a plurality of positions, said adjustment means including third means to fix said adjustment means at a selected said position, whereby the filler rod is movable to be located directly adjacent the welding electrode regardless of what inclined position the welding electrode has assumed.

2. Apparatus as defined in claim 1 wherein:
   said third means comprising a nut threadably mounted within said positioning assembly housing, said nut capable of being tightened to frictionally bind against said positioning guide rod so as to fix such in position.

3. In an automatic welding apparatus having a welding electrode, said welding electrode to move longitudinally in a prescribed path to produce a weld bead upon a workpiece, said apparatus comprising:
   a welding electrode housing containing said welding electrode;
   a welding apparatus housing;
   said welding electrode housing being attached by a first means to said welding apparatus housing, said first means permitting adjustable pivotal movement of said welding electrode housing in respect to said welding apparatus housing, second means located between said welding electrode housing and said welding apparatus showing for fixedly positioning said welding electrode housing in respect to said welding apparatus housing;

a filler wire feeding mechanism comprising a mechanism housing attached to said welding apparatus housing, said filler wire feeding mechanism adapted to feed a filler wire directly adjacent said welding electrode, a first guide rod connected through a universal joint to said mechanism housing, a filler wire positioning assembly fixedly connected to said welding electrode housing, said positioning assembly located directly adjacent said welding electrode, and semi-flexible means interconnects said first guide rod and said positioning assembly housing whereby to permit a slight amount of movement between said first guide rod and said positioning assembly housing.

4. Apparatus as defined in claim 3 wherein:
said semi-flexible means comprises a spring.

5. In an automatic welding apparatus having a welding electrode, said welding electrode to move longitudinally in a prescribed path to produce a weld bead upon a workpiece, said apparatus comprising:

a welding electrode housing containing said welding electrode;

a welding apparatus housing;

said welding electrode housing being attached by a first means to said welding apparatus housing, said first means permitting adjustable pivotal movement of said welding electrode housing in respect to said welding apparatus housing, second means located between said welding electrode housing and said welding apparatus housing for fixedly positioning said welding electrode housing in respect to said welding apparatus housing;

a filler wire feeding mechanism comprising a mechanism housing attached to said welding apparatus housing, said filler wire feeding mechanism adapted to feed a filler wire directly adjacent said welding electrode, a first guide rod connected through a universal joint to said mechanism housing, a filler wire positioning assembly fixedly connected to said welding electrode housing, said positioning assembly located directly adjacent said welding electrode;

said positioning assembly includes a positioning guide rod mounted by adjustment means to said positioning assembly, said adjustment means permitting movement of said positioning guide rod to a plurality of positions, said adjustment means including third means to fix said adjustment means at a selected said position, whereby the filler rod is movable to be located directly adjacent the welding electrode regardless of what inclined position the welding electrode has assumed;

said third means comprising a nut threadably mounted within said positioning assembly housing, said nut capable of being tightened to frictionally bind against said positioning guide rod so as to fix such in position; and a coiled spring means interconnects said first guide rod and said nut whereby a small amount of movement is permitted between said positioning assembly housing and said first guide rod.

* * * * *